D. C. PUDERBAUGH.
TRUCK FOR HANDLING AUTOMOBILES.
APPLICATION FILED JUNE 16, 1916.

1,230,326.

Patented June 19, 1917.

Inventor
David C. Puderbaugh
By Jas. L. Skidmore
His Attorney.

UNITED STATES PATENT OFFICE.

DAVID C. PUDERBAUGH, OF EL DORADO, PENNSYLVANIA.

TRUCK FOR HANDLING AUTOMOBILES.

1,230,326.      Specification of Letters Patent.      Patented June 19, 1917.

Application filed June 16, 1916. Serial No. 103,966.

*To all whom it may concern:*

Be it known that I, DAVID C. PUDERBAUGH, citizen of the United States, residing at El Dorado, in the county of Blair and State of Pennsylvania, have invented certain new and useful Improvements in Trucks for Handling Automobiles, of which the following is a specification.

My invention relates to portable trucks or turn-tables for handling automobiles of all types of construction, and is especially designed for use in garages or repair shops where there is small space to be utilized in turning them around and placing them side by side.

The main object of this invention is to provide a simple, strong, economical, durable and efficient truck for handling automobiles in connection with an inclined plane or skid which is removably attached to the bottom portion of the said truck.

A further object of the invention is to provide a truck which can be quickly and easily operated and may be readily moved and utilized in any part of the building without the use of a turn-table, track, rail, guideway or other means mounted upon or fastened to the foundation or flooring, or without digging up the foundation or altering the flooring in any manner for such purposes.

The foregoing and such other objects as may appear from the ensuing description are attained by the novel features of construction and arrangement of parts, hereinafter fully described, illustrated in the accompanying drawings, and particularly pointed out in the claims appended hereto, it being understood that slight changes in the form, proportions, and minor details of the construction may be resorted to without departing from the spirit or sacrificing any of the advantages of the invention.

In the accompanying drawings it will be seen that:—

Figure 1:
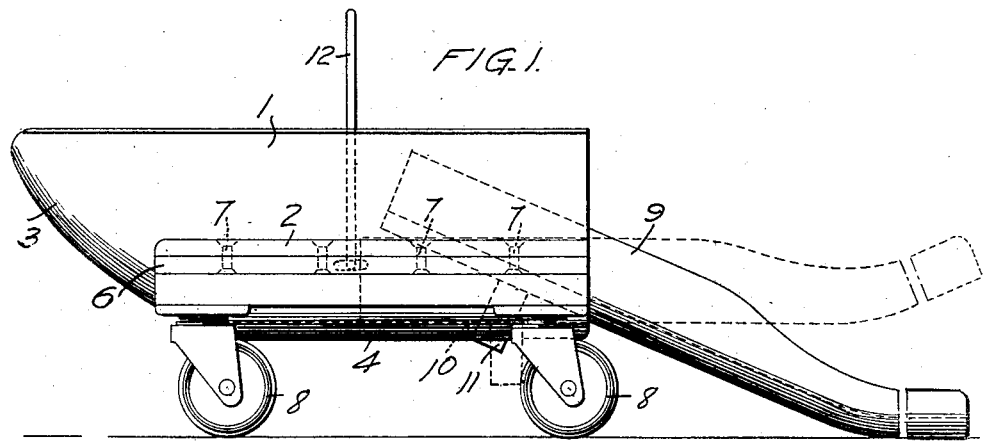
Figure 2:
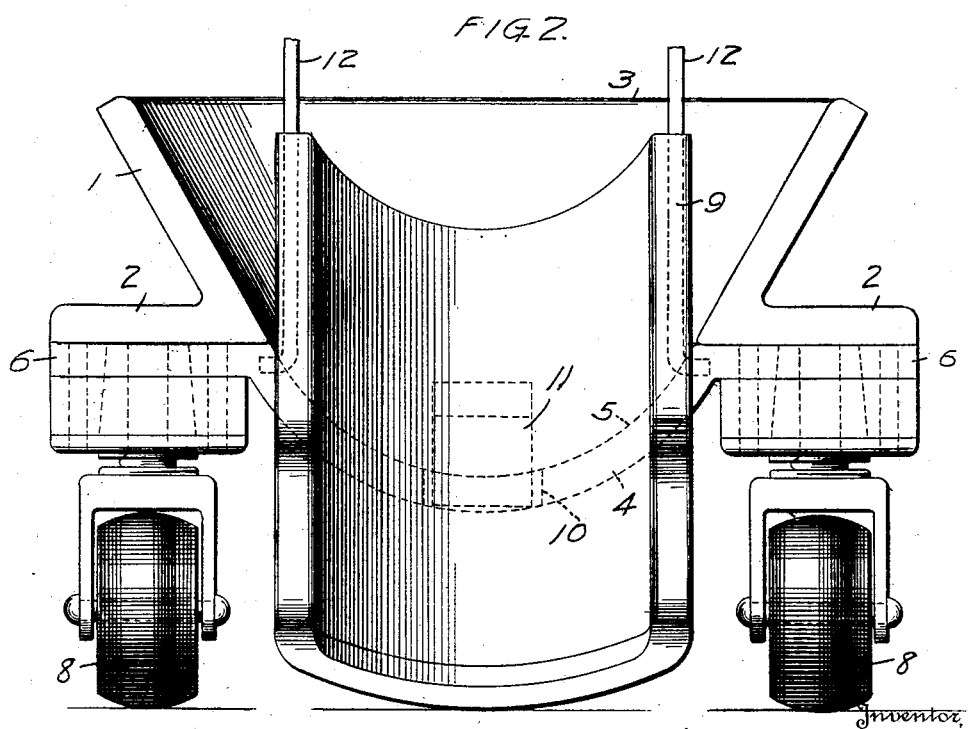

Figure 1, is a side elevation of the improved device embodying my invention, and Fig. 2 is an enlarged end view of the same.

Similar numerals of reference are employed to designate corresponding parts throughout the several figures of the drawings.

In the embodiment of this invention as illustrated, and which shows a preferred construction, the body portion is comprised of two members, a top or cage member 1, provided at each side thereof with a lateral and longitudinal extension 2, and an upwardly and outwardly extended rear portion 3 so shaped that it will serve to receive any size of wheel and is adapted to constitute a stop to prevent the automobile wheel from accidentally running off the truck, and a lower platform member 4, having a dished or concaved central portion 5 and provided at either side with a laterally projecting portion 6 extending substantially the entire length of said bottom member, the said top and bottom members being riveted together at each side thereof with countersunk rivets 7, as shown in Fig. 1 of the drawings.

To the body portion of the truck near each end thereof are secured by countersunk rivets, shown by dotted lines in Fig. 2, two casters 8, one caster at each side of and near each end thereof, said casters being of any desired or suitable type.

As shown in the drawings, an inclined plane or skid 9 is attached to the front end portion of the truck, the lower or bottom member 4 being provided near its forward end with an opening or slot 10, adapted to receive the tongue or integral projection 11 extending from the central rear portion of said inclined plane or skid 9, the said slot or opening being sufficiently large to prevent the tongue or projection 11 from binding therein when the automobile wheel is at rest on the truck and skid.

The platform member 4 is provided at either inner side portion, at a point in front of the longitudinal center of its laterally projecting portion 6 with an elongated slot, shown in dotted lines, adapted to receive a bail 12, which bail when turned upward will prevent the automobile from running off the front end of the turner and said bail may also be used to lift the turner.

It will be readily understood that the bail may be easily attached by pressing the lower ends toward each other, and when the pressure is relieved the lower ends will enter the slots in the platform and engage therewith. The said bail may also be readily removed by pressing the lower ends together until the ends are in a position to clear the outer ends of the slots.

It will be seen that when the automobile wheel is at rest on the truck and skid, the said skid will assume the position shown in dotted lines Fig. 1.

It is also evident that since the inclined plane or skid 9 is made of a separate piece of material and its contour being such as to fit the concaved bottom member, the said plane or skid may be readily attached to and detached from the body of the truck when necessary.

While I have shown my improved truck as being constructed of pressed steel and riveted together, it is obvious that it may be made of wood, cast iron, or any other suitable material possessing sufficient strength to serve the purpose for which the said trucks are intended.

Having thus described my invention what I claim and desire to secure by Letters Patent is:—

1. A truck comprising an upper member having lateral and longitudinal extensions at each side thereof and an upwardly and outwardly projecting rear portion, a bottom member provided with lateral and longitudinal extensions fastened to the extensions of said upper member, and a caster at each end and each side fixedly secured to the extensions of said bottom member.

2. A truck comprising an upper member having lateral and longitudinal extensions at each side thereof, a bottom member having a concaved central portion and provided with lateral and longitudinal extensions riveted to the extensions of the upper member, and a series of casters riveted to the extensions of the said bottom member.

3. A truck comprising an upper member having lateral and longitudinal extensions at each side thereof, a bottom member having a concaved central portion and lateral and longitudinal extensions fixedly secured to the extensions of the upper member and provided with an opening therethrough near its front end portion, in combination with an inclined plane provided with a projection at its central portion near the rear end thereof adapted to be fitted in said opening, and a series of casters fixedly secured to the extensions of the said bottom member.

4. A truck comprising an upper member having lateral and longitudinal extensions at each side thereof, a bottom member having a concaved central portion and lateral and longitudinal extensions riveted to the extensions of the upper member and provided with an opening therethrough near its front end portion, in combination with an inclined plane having a concaved upper surface and provided with an integral projection near the rear end thereof adapted to be fitted within said opening, and a series of casters riveted to the extensions of the said bottom member.

5. A truck comprising an upper member having lateral and longitudinal extensions at each side thereof and an upwardly and outwardly rear portion, a bottom member provided with lateral and longitudinal extensions fixedly secured to the extensions of the upper member and having a concaved central portion and an opening therethrough near the rear end thereof, in combination with an inclined plane having a concaved upper surface and an integral projection near the rear end thereof adapted to be fitted within said opening with the rear portion of said inclined plane resting upon the upper front portion of said bottom member, and a caster at each end and each side portion fixedly secured to the extensions of the bottom member.

DAVID C. PUDERBAUGH.

Copies of this patent may be obtained for five cents each, by addressing the "Commissioner of Patents, Washington, D. C."